Patented July 21, 1931

1,815,802

UNITED STATES PATENT OFFICE

FRANZ SCHLEICHER, OF WIESDORF-ON-THE-RHINE, GEORG SCHWAEBEL, OF LEVER-KUSEN-ON-THE-RHINE, AND KURT BRIESEWITZ, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR DEHYDRATING VAPOR MIXTURES CONTAINING ACETIC ANHYDRIDE AND WATER

No Drawing. Application filed January 26, 1928, Serial No. 249,762, and in Germany February 11, 1927.

The present invention relates to a process for the dehydration of vapour mixtures containing acetic anhydride, acetic acid and water by removing the water in the form of vapour and simultaneously condensing the acetic anhydride in a single operation. When carrying out the invention, there is added in the liquid state a low boiling organic solvent indifferent to water, acetic anhydride and acetic acid or alternatively a mixture of one or more low boiling solvents with one or more solvents of higher boiling point, which not only facilitate the evaporation of the water, but simultaneously reduce the vapour tension of the acetic anhydride. The working of the process is effected by the use of the customary separating columns in which the organic solvent employed as the carrier for the water-vapour is not only introduced from the top of the column, but also simultaneously from below. The process may also be carried out by using the solvents in the vaporized state, but in that case care should be taken that the temperature of the vapors of the solvents entering the column is not too high, preferably not higher than about 100° C. Furthermore the separating column may be extended by placing at the upper end a dephlegmator, in which case the organic solvents are forced into the separating column only from below.

The quantity of the organic solvent used may be varied within the widest limits, and in carrying out our process anyone skilled in the art will readily find a suitable ratio of solvent to the mixture of water, acetic anhydride and acetic acid. When continuously carrying out our process, we prefer to use at least an amount of solvent equal in volume to one half the volume of the initial acetic acid used.

A vapor mixture of acetic anhydride, acetic acid and water, as contemplated to be used in our new process is, as is known, obtained by the pyrogenic decomposition of acetic acid. As the most valuable product, the acetic anhydride, is very easily saponified again by the admixed water with the reformation of acetic acid, it becomes necessary to remove the water from the reaction product in such a manner, that the yield of acetic anhydride is not prejudiced.

The new process can be carried out in a separating column of the customary type, in which the still super-heated vapours of acetic anhydride, acetic acid and water are rinsed from above with an indifferent solvent boiling at about the boiling point of water, which means, between about 80° C. and 110° C., such as benzene, toluene, chloroform, ethylene chloride, trichloroethylene and the like, in such a manner and with such quantities that substantially only water distils over with the said solvent or a corresponding mixture thereof, while the acetic anhydride and the bulk of the acetic acid condense with a small quantity of the respective solvent, substantially free from water, and run off below.

Mixtures of solvents can be employed with especial advantage, in which one constituent, as stated above, operates as a carrier for the water vapour, while the other constituent, a solvent having a boiling point higher than acetic anhydride, say, between about 180° and 250° C. such as ortho-dichlorobenzene, quinoline, quinaldine and the like, reduces the vapour tension of the acetic anhydride.

The action of the solvent or of the mixture of solvents trickling down the separating column can likewise be produced by the use of a dephlegmator, in which case the solvent or mixed solvents are forced into the separating column from below.

By way of example a separating column of the customary construction is employed, in which a readily volatile solvent, for example, benzene or a mixture of solvents, for example a mixture of benzene and dichlorobenzene or of benzene and quinoline is caused to trickle down from above. In this connection it is advantageous also to inject into the separating column from below a current of benzene, toluene, or the like. Or, a separating column may be used, which has been extended by having placed at its upper en.' a dephlegmator. The working of the process is then effected by injecting at the lower end of the column a readily volatile solvent, for example, trichloro-ethylene or a mixture of readily volatile solvents, for example, benzene and trichloroethylene.

The anhydride condenses in a suitably heated receiver, the temperature of which is adjusted to correspond to the nature and quantity of the solvents trickling down the column. The fractionation of the acetic anhydride mixture can then proceed either continually or intermittently.

In all these cases, the yield of anhydride, as ascertained by sampling from the column, is found to be substantially quantitative in the receiver, while the water distils over completely with the readily volatile solvent.

We claim:

1. In the process for the dehydration of a vapor mixture containing acetic anhydride, acetic acid and water, the steps which comprise adding to the vapor mixture at least one organic solvent indifferent to acetic anhydride and having a boiling point of about that of water and removing the water together with said solvent by subjecting the vapor mixture to fractional distillation.

2. In the process for the dehydration of a vapor mixture containing acetic anhydride, acetic acid and water, the steps which comprise adding to the vapor mixture at least one organic solvent indifferent to acetic anhydride and having a boiling point between about 80° and 110° C., and removing the water together with said solvent by subjecting the vapor mixture to fractional distillation.

3. In the process for the dehydration of a vapor mixture containing acetic anhydride, acetic acid and water, the steps which comprise adding to the vapor mixture at least one solvent of the group consisting of benzene, toluene, chloroform, ethylene chloride and trichloroethylene, and removing the water together with said solvent by subjecting the vapor mixture to fractional distillation.

4. In the process for the dehydration of a vapor mixture containing acetic anhydride, acetic acid and water, the steps which comprise adding to the vapor mixture an organic solvent having a boiling point of about that of water and another organic solvent having a boiling point higher than acetic anhydride both organic solvents being indifferent to acetic anhydride, and removing the water together with the solvent having a boiling point of about that of water by subjecting the vapor mixture to fractional distillation.

5. In the process for the dehydration of a vapor mixture containing acetic anhydride, acetic acid and water, the steps which comprise adding to the vapor mixture an organic solvent having a boiling point between about 80° and 110° C. and another solvent having a boiling point between 180 and 250° C., both solvents being indifferent to acetic anhydride, and removing the water together with the solvent having a boiling point of about that of water by subjecting the vapor mixture to fractional distillation.

In testimony whereof we have hereunto set our hands.

FRANZ SCHLEICHER.
GEORG SCHWAEBEL.
KURT BRIESEWITZ.